US006907967B1

(12) United States Patent
Kapaan et al.

(10) Patent No.: US 6,907,967 B1
(45) Date of Patent: Jun. 21, 2005

(54) COMPACT ACTUATOR

(75) Inventors: Hendrikus Jan Kapaan, Nieuwegein (NL); Johannes Albertus Van Winden, Heidelberg (NL); Jacobus Zwarts, Nieuwegein (NL); Thomas Wilhelm Fucks, Röthlein (DE)

(73) Assignee: SKF Engineering & Research Centre B.V., Nieuwegein (NL)

( * ) Notice: Subject to any disclaimer, the term of this patent is extended or adjusted under 35 U.S.C. 154(b) by 0 days.

(21) Appl. No.: 09/889,932

(22) PCT Filed: Jan. 27, 2000

(86) PCT No.: PCT/NL00/00053

§ 371 (c)(1),
(2), (4) Date: Sep. 17, 2001

(87) PCT Pub. No.: WO00/45064

PCT Pub. Date: Aug. 3, 2000

(30) Foreign Application Priority Data

Jan. 27, 1999 (NL) ..................................... 1011142

(51) Int. Cl.[7] .............................................. F60L 7/00
(52) U.S. Cl. ....................... 188/162; 188/156; 188/72.8
(58) Field of Search ............................ 188/71.9, 728, 188/156, 157, 158, 159, 162

(56) References Cited

U.S. PATENT DOCUMENTS

| 4,180,146 A | * | 12/1979 | Airheart ..................... 188/71.8 |
| 4,809,824 A | * | 3/1989 | Fargier et al. ........... 188/106 P |
| 4,987,788 A | | 1/1991 | Bausch |
| 5,293,966 A | * | 3/1994 | Chareire ................. 188/151 A |
| 5,348,123 A | * | 9/1994 | Takahashi et al. .......... 188/162 |
| 5,788,023 A | * | 8/1998 | Schoner et al. ............. 188/158 |
| 5,931,268 A | * | 8/1999 | Kingston et al. ........... 188/158 |
| 6,089,359 A | * | 7/2000 | Tanaka ....................... 188/156 |
| 6,112,864 A | * | 9/2000 | Suzuki et al. ............... 188/158 |
| 6,139,460 A | * | 10/2000 | Drennen et al. ........... 188/72.1 |
| 6,325,182 B1 | * | 12/2001 | Yamaguchi et al. ........ 188/162 |
| 6,349,801 B1 | * | 2/2002 | Koth et al. ................. 188/72.8 |
| 6,367,592 B1 | * | 4/2002 | Kapaan et al. ............. 188/158 |
| 6,367,593 B1 | * | 4/2002 | Siler et al. .................. 188/162 |
| 6,367,597 B1 | * | 4/2002 | De Vries et al. ........ 188/196 V |

FOREIGN PATENT DOCUMENTS

| DE | 196 52 230 A1 | | 6/1998 |
| DE | 19807328 | * | 9/1999 |
| WO | WO 99/42739 | * | 8/1999 |

* cited by examiner

Primary Examiner—Robert A. Siconolfi
Assistant Examiner—Devon Kramer
(74) Attorney, Agent, or Firm—Oliff & Berridge, PLC

(57) ABSTRACT

An actuator including a housing accommodating a screw mechanism and a drive including a motor. The screw mechanism includes a nut and a screw, one of which is rotatably supported with respect to the housing. Upon relative rotation of the nut and the screw, linear movement of one of the nut and the screw is obtained. At least a rotatable component of the drive, for example, the rotor of the motor, is rotatably supported on the screw which is rotatably supported with respect to the housing.

33 Claims, 4 Drawing Sheets

COMPACT ACTUATOR

BACKGROUND OF THE INVENTION

1. Field of Invention

The invention is related to an actuator, comprising a housing which contains a screw mechanism and a motor, said screw mechanism comprising a nut and a screw, one of which is rotatably supported with respect to the housing, such that upon relative rotation of the nut and the screw a linear movement of one of said nut and screw is obtained.

2. Description of Related Art

In certain applications, such as actuators for disc brakes, clutches etcetera, it is desirable to limit the overall dimensions and possibly the weight as much as possible. According to the invention, a compact layout may be obtained in that at least a rotatable component of the drive, e.g. the rotor of the motor, is rotatably supported on the screw which is rotatably supported with respect to the housing.

In particular, in case the screw is rotatably supported with respect to the housing by means of a support bearing, the screw may be integrated with the outer ring of the support bearing, such that the rotor of the motor, by means of an auxiliary bearing, is rotatably supported on the outer ring of the support bearing.

The support bearing is preferably accommodated with the auxiliary bearing. In such embodiment, a compact and stiff support for the rotor and screw is obtained.

The linear movement provided by the actuator usually generates a force, e.g. in the case of a disc brake for clamping the brake pads onto the brake disc.

As a result of the inevitable flexibility of the actuator and the system to which said actuator is connected, elastic deformations are also generated.

In so far as these deformations are axial-symmetric with respect to the screw mechanism, no problems occur as to the proper function of the actuator. However, in certain cases, and in particular in the case of disc brakes, loads are generated which are eccentric with respect to the actuator.

The eccentricity is to be attributed to the asymmetric shape of the brake calliper, in particular of the claw piece thereof which carries the brake pads and which accommodates the brake disc sideways.

Upon pressing the brake pads onto the brake disc, the claw piece is loaded in bending, which bending action is also transferred onto the housing of the actuator. As the screw mechanism is supported within the housing, said mechanism may become exposed to bending as well.

The screw mechanism is however rather vulnerable with respect to misaligned forces, in such a way that the proper function may be hampered and that damage may occur.

SUMMARY OF THE INVENTION

The object of the invention is therefore to provide an actuator of the type described before, which is less vulnerable with respect to misaligned forces. This object is achieved in that the screw mechanism is supported with respect to the housing by means of a joint which allows rotations about at least one axis transverse with respect to said linear movement.

In case the housing of the actuator is loaded in bending, said bending action is relieved as a result of the freedom of the screw mechanism to rotate around the transverse axis or axes. Thus, the screw mechanism will not be exposed to misaligned forces.

In particular, one of the nut and screw is rotatably supported both according to an axis parallel with respect to said linear movement, and according to at least one axis transverse with respect to said linear movement. Said transverse rotation may be obtained by means of a ball joint.

Said ball joint may be situated at one end of a central support shaft, the other end of which is connected to the housing. According to a preferred embodiment, said ball joint may be connected to a support bearing supporting one of the nut and the screw, said one of the nut and the screw being drivably connected to the rotor of the motor.

The motor, preferably an electric motor, may engage the screw mechanism in several different ways. Usually, said motor is also connected to the housing, which means that the connection between the motor and the screw mechanism is also exposed to the elastic bending action of the housing under brake load.

Misalignment can be avoided here in case the nut and the screw engages the rotor through a coupling which allows rotations about at least one axis transverse with relation to the linear movement.

Said coupling may comprise an internally toothed member as well as an externally toothed member having equal number of teeth. The bending action of the housing can be accommodated in particular in case the teeth of the externally toothed member are convexly curved in a cross-section parallel to the linear movement, and in case the teeth of the externally toothed member are centered with respect to the ball joint.

A compact embodiment is obtained in case the outer ring of the bearing is integrated with an internally toothed member. The screw and the internally toothed member are at axially opposite ends of the outer ring.

Conveniently, the rotor of the motor is rotatably supported on the outer ring of the support bearing.

According to a first embodiment, the rotor engages an externally toothed member through a reduction gear mechanism. Preferably, the support bearing is supported on one end of a support shaft, the other end of which is connected to the housing, the externally toothed member being rotatably supported on said support shaft.

BRIEF DESCRIPTION OF THE DRAWINGS

The invention will now be described with reference to the embodiments shown in the figures.

DETAILED DESCRIPTION OF EXEMPLARY EMBODIMENTS

Figure 1:
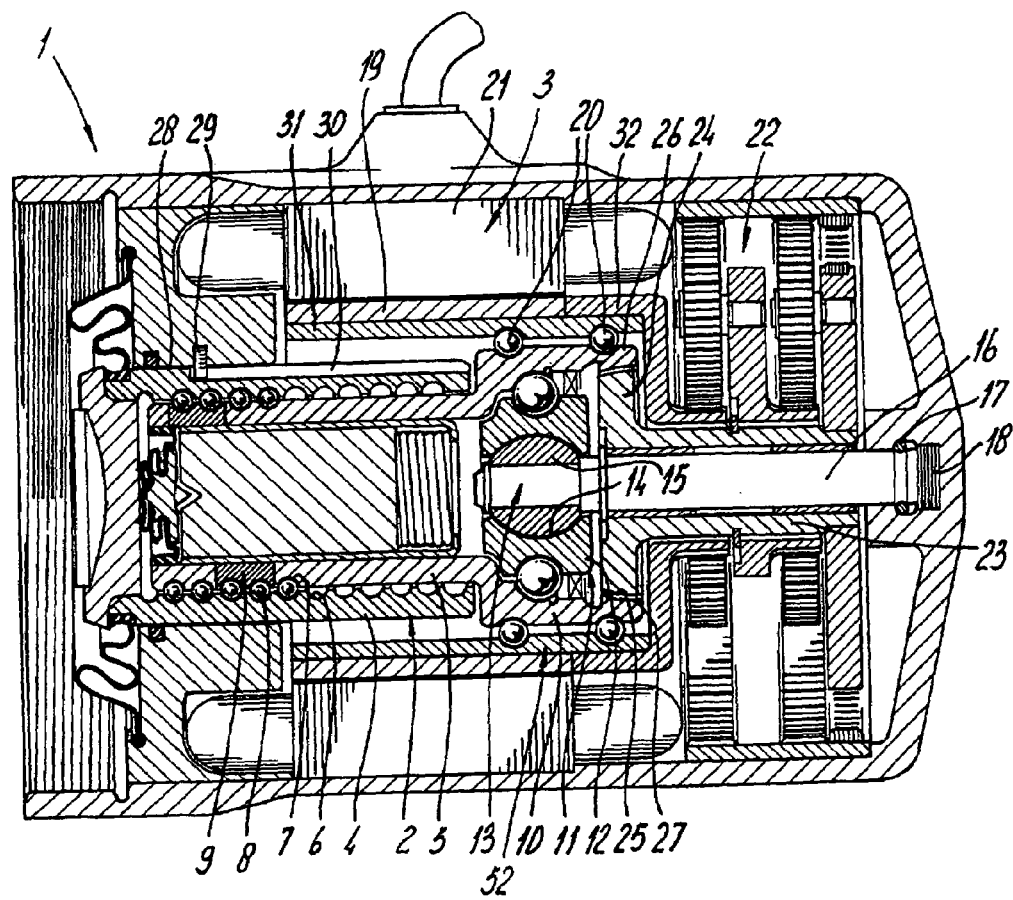
FIG. 1 shows a first embodiment in longitudinal section.
Figure 2:
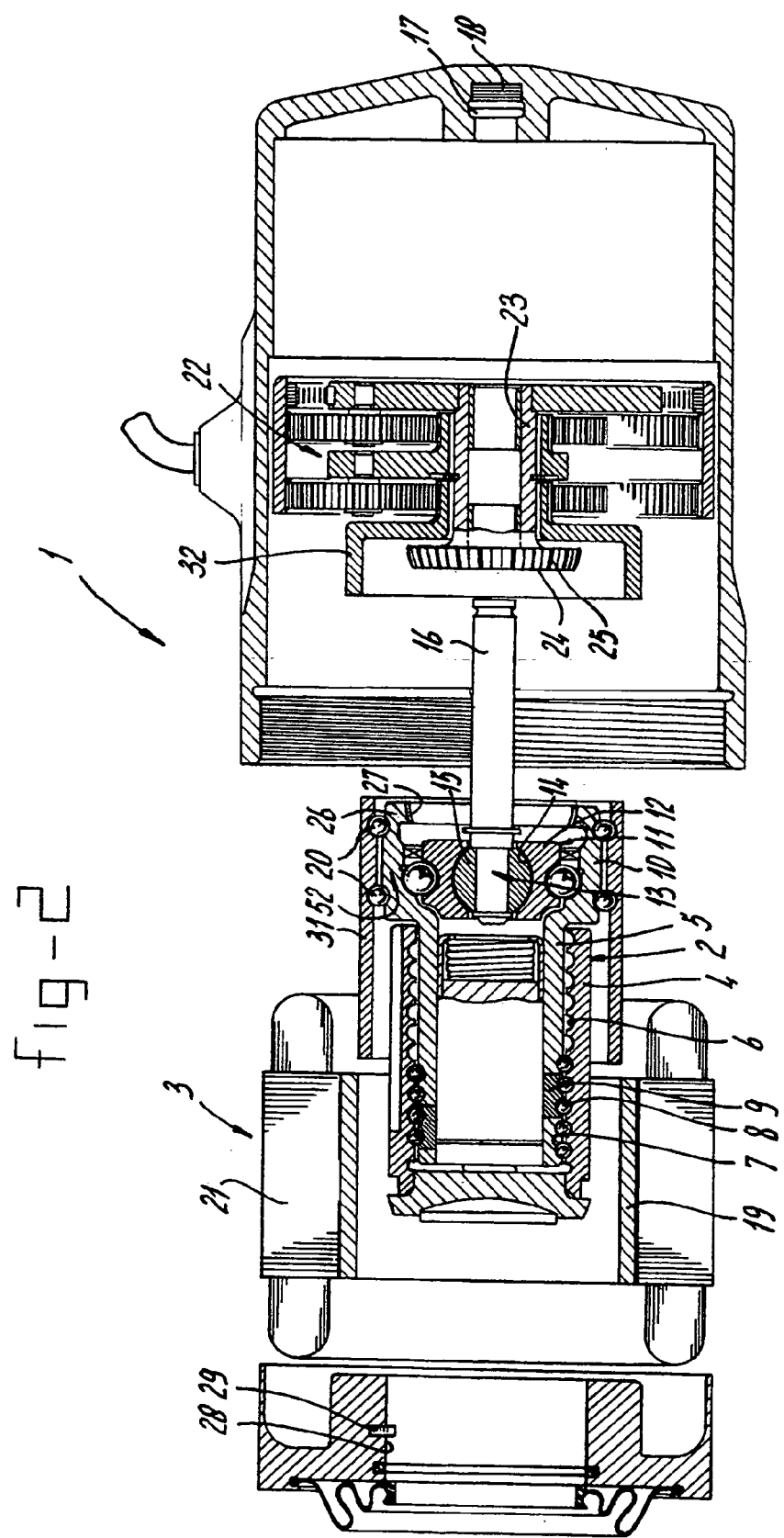
FIG. 2 shows an exploded view of the embodiment according to FIG. 1.

The actuator shown in FIGS. 1 and 2 comprises a housing 1 containing a screw mechanism 2 and a motor 3. Said screw mechanism 2 comprises a nut 4 and a screw 5, provided with screw threads 6, 7 and which engage each other by means of a number of balls 8. At the location of the inserts 9, the balls are transferred between adjacent windings of the screw threads 6, 7.

The screw 5 is integrated with the outer ring 10 of support bearing 11. The outer ring 10 has a larger diameter than the screw 5, for reasons of compactness of the actuator.

The inner ring 12 of the support bearing 11 is integrated with a ball joint 13. In particular, the inner ring has a spherical inner surface 14, which engages a ball 15 connected to the central support shaft 16.

Although the ball 15 is depicted as a separate part, it may also be carried out in one piece with the central support shaft 16. The central support shaft 16 is connected to the housing through the clip ring arrangement 17, and load cell 18 for measuring axial forces.

The rotor 19 of the motor 3 is supported with respect to the outer ring of the support bearing 11 by means of a sleeve 31 having integrated bearings 20. Said sleeve 31 is fixed to the stator 21. The stator 21 of the motor 3 is fixably connected to the housing 1. Furthermore, the sleeve 31 is fixed to sleeve 32 of a reduction gear wheel mechanism 22.

By means of the reduction gear wheel mechanism 22, the motor 3 drives the sleeve 23, which carries an outwardly toothed member. This outwardly tooth member has teeth 25, which have a curved shape.

The outer ring 10 of the support bearing 11 carries an inwardly toothed member 26, which carries inwardly directed teeth with a correspondingly curved shape.

The number of outwardly directed teeth 25 and inwardly directed teeth 27 is equal. These teeth engage each other so as to transfer the driving action from the sleeve 23 onto the screw 5.

The nut 4 is carried out as a piston which is slidably held in a cylindrical space 28 in the housing 1. By means of pin 29 and groove 30 in the cylinder, said cylinder is held axially movable, but non-rotatable within the cylinder space 28.

Upon actuating the screw 5, the nut is therefore driven linearly and in axial direction with respect to the housing 1, e.g. for driving the brake pads of a brake calliper (not shown) towards and from each other.

In case, as a result of the forces generated in the housing 1, e.g. the housing of a brake calliper, a flexible bending is imposed thereon, the screw mechanism 2 is still protected against such loadings. Generally, screw mechanisms have a poor resistance against bending action, and the screw mechanism 2 in question is relieved from any bending loads due to the ball joint 13.

Figure 3:
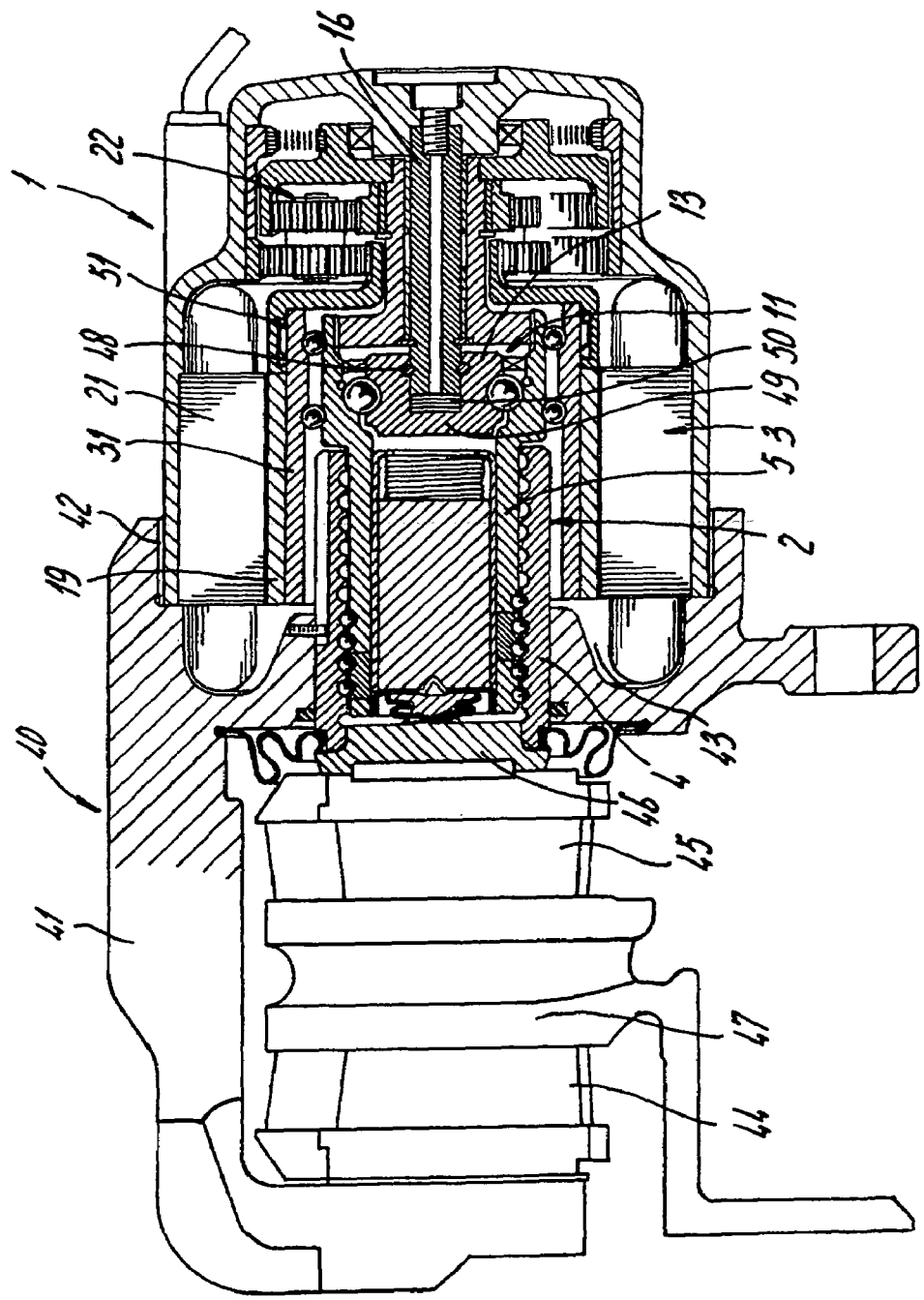
FIG. 3 shows a second embodiment.

Also, the driving connection between motor 3 and screw mechanism 2 is relieved from any bending loads due to the teeth drive of the inwardly tooth member 26 and the outwardly tooth member 24, and the curved shape of the teeth in question. The embodiment of FIG. 3 shows a brake calliper 40, comprising a housing 1 connected to claw piece 41 by means of screw thread. At its side facing the actuator 1, the claw piece 41 has a cavity 43 in which part of the stator 21 of motor 3 has been accommodated. Thereby, a very compact brake calliper 40 is obtained.

As usual, the claw piece 41 has a fixed brake pad 44 as well as a movable brake pad 45 which is connected to the nut 5 of the screw mechanism 2, in particular to the head 46 thereof.

Between the brake pads 44, 45, a brake disc 47 is accommodated. The support shaft 16 supports the support bearing 11, the inner ring 12 thereof being fixedly connected by means of e.g. a clip ring 48.

In this embodiment, the inner ring 12 of support bearing 11 has a closed head 49, such that a load cell 50 can be accommodated between said closed head 49 and the facing end of support shaft 16.

The other components of this embodiment are to a large extend identical to the embodiment of FIGS. 1 and 2.

Figure 4:
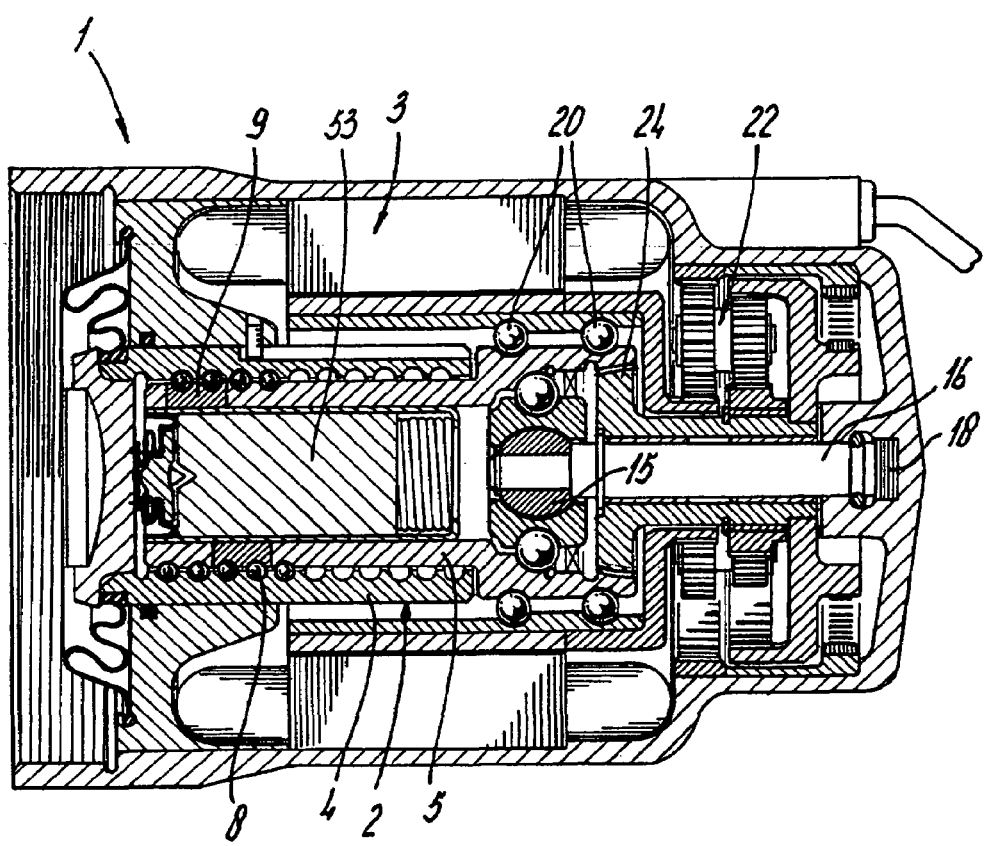
FIG. 4 shows a third embodiment.

In the embodiment of FIG. 4, it is shown that the external teeth 25 of the externally toothed member 24 are rounded off in longitudinal cross-section, so as to better allow bending deformations of the housing, without however transferring the bending action onto the screw mechanism 2.

A grease-dosing unit 53 is accommodated in the base of the screw 5.

What is claimed is:

1. An actuator, comprising:
   a housing accommodating a screw mechanism; and
   a drive comprising a motor, wherein said screw mechanism comprises a nut and a screw, of which the screw is rotatably supported relative to the housing, such that upon relative rotation of the nut and the screw, a linear movement of said nut is obtained,
   wherein at least a rotatable component of the drive is rotatably supported with respect to the screw which is rotatably supported relative to the housing, and the rotatable component of the drive is a rotor of the motor, said rotor being coaxial with respect to the screw.

2. The actuator according to claim 1, wherein the screw is rotatably supported with respect to the housing by a support bearing.

3. The actuator according to claim 2, wherein the rotor of the motor is rotatably supported on the screw by an auxiliary bearing.

4. The actuator according to claim 3, wherein the support bearing is accommodated within the auxiliary bearing.

5. The actuator according to claim 2, wherein the screw is integrated with an outer ring of the support bearing.

6. The actuator according to claim 5, wherein an outer diameter of the outer ring of the support bearing is larger than an outer diameter of the screw.

7. The actuator according to claim 2, wherein an outer ring of the support bearing supports a rotatable sleeve which is in connection with the rotatable component of the drive.

8. The actuator according to claim 7, wherein the sleeve is rotatably connected to an outer ring of an auxiliary bearing which in turn is rotatably connected to an inner ring of the outer ring of the support bearing.

9. The actuator according to claim 8, wherein an inner surface of the sleeve comprises two axially spaced raceways, each of said raceways engaging a number of rolling elements which each engage a raceway on an outer surface of the outer ring of the support bearing.

10. The actuator according to claim 7, wherein the sleeve is connected to the rotor of the motor.

11. The actuator according to claim 1, wherein the screw is rotatably supported according to an axis parallel with respect to said linear movement, and according to at least one axis transverse with respect to said linear movement.

12. The actuator according to claim 11, the screw is supported with respect to the housing by a ball joint.

13. The actuator according to claim 12, wherein the ball joint is at one end of a central support shaft, and the other end of the central support shaft is connected to the housing.

14. The actuator according to claim 13, wherein the ball joint is connected to a support bearing, said support bearing supporting the screw, wherein said one of the nut and the screw is drivably connected to the rotor of the motor.

15. The actuator according to claim 14, wherein the screw engages the rotor through a coupling which allows rotation about at least one axis transverse relative to the linear movement.

16. The actuator according to claim 15, wherein a coupling comprises an internally toothed member and an externally toothed member having an equal number of teeth.

17. The actuator according to claim 16, wherein the teeth of the externally toothed member are convexly curved in a cross-section parallel to the linear movement.

18. The actuator according to claim 16, wherein the teeth of the externally toothed member are centered with respect to the ball joint.

19. The actuator according to claim 14, wherein the screw is integrated with an outer ring of the support bearing.

20. The actuator according to claim 19, wherein an outer diameter of the outer ring of the support bearing is larger than an outer diameter of the screw.

21. The actuator according to claim 19, wherein the outer ring of the support bearing is integrated with an internally toothed member.

22. The actuator according to claim 20, wherein the screw and an internally toothed member are at axially opposite ends of the outer ring of the support bearing.

23. The actuator according to claim 19, wherein the rotor of the motor is rotatably supported on the outer ring of the support bearing.

24. The actuator according to claim 23, wherein the rotor engages an externally toothed member through a reduction gear mechanism.

25. The actuator according to claim 24, wherein the support bearing is supported on one end of a support shaft, the other end of the support shaft is connected to the housing, the externally toothed member being rotatably supported on said support shaft.

26. The actuator according to claim 19, wherein the rotor of the motor directly engages the outer ring of the support bearing.

27. The actuator according to claim 26, wherein the rotor is integrated with an internally toothed member, and the outer ring of the support bearing is integrated with an externally toothed member, said members engaging each other.

28. The actuator according to claim 13, wherein the screw and the support shaft each have a through going bore respectively, said bores being aligned with each other.

29. The actuator according to claim 1, wherein the screw includes a bore containing a grease dosing unit.

30. The actuator according to claim 1, wherein at least one of the screw mechanism, a support bearing, an auxiliary bearing and a reduction gear mechanism comprises a surface obtained by hard turning.

31. The actuator according to claim 1, wherein at least one of the screw mechanism, a support bearing, an auxiliary bearing and a reduction gear mechanism comprises a diamond-like carbon coating.

32. The actuator according to claim 1, wherein an encoder is provided for measuring a relative rotation.

33. A brake calliper for a disc brake, comprising:
- a claw piece carrying at least two opposite brake pads which enclose a gap for accommodating the disk brake; and
- an actuator, wherein said actuator comprises: a housing accommodating a screw mechanism; and a drive comprising a motor, wherein said screw mechanism comprises a nut and a screw, of which the screw is rotatably supported relative to the housing, such that upon relative rotation of the nut and the screw, a linear movement of said nut is obtained, said housing being connected to the claw piece, wherein at least a rotatable component of the drive is rotatably supported with respect to the screw which is rotatably supported relative to the housing, and wherein the rotatable component of the drive is a rotor of the motor, said rotor being coaxial with respect to the screw.

* * * * *